(12) United States Patent
Jawalkar Nagaraj et al.

(10) Patent No.: US 8,608,604 B1
(45) Date of Patent: Dec. 17, 2013

(54) TORQUE DIVIDER AND TORQUE CONVERTER WITH LOCKUP CLUTCH

(71) Applicant: Caterpillar Inc., Peoria, IL (US)

(72) Inventors: Amarnath Rao Jawalkar Nagaraj, Peoria, IL (US); Timothy J. May, Princeton, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/655,960

(22) Filed: Oct. 19, 2012

(51) Int. Cl.
*F16H 47/08* (2006.01)

(52) U.S. Cl.
USPC ................................................. 475/47

(58) Field of Classification Search
USPC ........................................................ 475/47
See application file for complete search history.

(56) References Cited

U.S. PATENT DOCUMENTS

| | | | |
|---|---|---|---|
| 3,712,154 A * | 1/1973 | Welch | 475/47 |
| 4,018,106 A | 4/1977 | Uozumi et al. | |
| 5,557,977 A * | 9/1996 | Stockton | 74/15.84 |
| 5,613,581 A | 3/1997 | Fonkalsrud et al. | |
| 5,711,735 A * | 1/1998 | Park | 475/44 |
| 7,081,068 B2 | 7/2006 | Nakagawa et al. | |
| 7,160,218 B2 * | 1/2007 | Becke et al. | 475/68 |
| 2008/0119316 A1 | 5/2008 | Ordo | |
| 2011/0124456 A1 | 5/2011 | Sung | |

* cited by examiner

*Primary Examiner* — Edwin A Young
(74) *Attorney, Agent, or Firm* — Baker Hostetler (57) ABSTRACT

A torque converter and torque divider includes a prime mover input and a torque converter. The torque converter and torque divider further includes a torque divider configured to receive the prime mover input and divide the prime mover input torque into at least a planetary system input torque and a second torque. A planetary gear system is configured to receive the planetary system input torque. The torque converter and torque divider further includes a lockup clutch configured to lock rotating components of at least one of the torque converter and the torque divider and further includes a torque output.

20 Claims, 6 Drawing Sheets

TORQUE DIVIDER AND TORQUE CONVERTER WITH LOCKUP CLUTCH

TECHNICAL FIELD

The disclosure relates to a torque converter having a torque divider. More particularly, the disclosure relates to a torque converter having a torque divider with a lockup clutch.

BACKGROUND

Many vehicles generally have a prime mover or internal combustion engine, a transmission to transmit drive power to move the vehicle, and a mechanism to selectively transfer rotational torque from the prime mover to the transmission. In some approaches, the mechanism to selectively transfer rotation from the prime mover to the transmission includes a manual clutch. A manual clutch is efficient. However, operation of the manual clutch requires extra effort and added operational oversight by the vehicle operator. Such extra effort and added operational oversight can be less desirable, for example as it can reduce the operator's efficiency. An alternative mechanism to transfer rotational torque from the prime mover to the transmission is a torque converter.

A torque converter is generally a hydrodynamic fluid coupling that typically transfers the rotational torque from a prime mover to a driven load such as a transmission. The torque converter multiplies the torque from the prime mover and transfers the torque to the transmission. United States patent application number 2011/0124456 to Sung discloses a launching device, transmission device and a torque combining device. The launching device, the transmission device, and the torque combining device are disposed on a first power delivery shaft directly connected to the engine. The launching device, the transmission device, and the torque combining device are disposed in a sequence of the launching device, the transmission device, and the torque combining device from the engine. The torque converter of the launching device includes a front cover connected to a crankshaft of the engine, an impeller connected to and rotating with the front cover, a turbine facing the impeller, and a stator disposed between the impeller and the turbine and delivering automatic transmission oil flowing out from the turbine to the impeller after changing flowing direction of the automatic transmission oil.

However, torque converters are typically less efficient, result in poor fuel economy, have hydraulic losses and the like in comparison to a mechanical clutch. Additionally, a torque converter in larger vehicle applications requires a great deal of torque transfer that can exasperate these problems. Moreover, due to the increased torque requirements of larger vehicles, a larger sized torque converter is typically required and this increases the cost of production and increases space requirements.

Accordingly, a torque converter that is more efficient, improves fuel economy, and reduces hydraulic losses is needed. Additionally, a torque converter having a reduced size and reduced cost of production is also desirable.

SUMMARY

The foregoing needs are met, to a great extent, by the disclosure, wherein in one aspect a process and device are provided to transfer rotational torque with a torque converter having a torque divider with a lockup clutch that is more efficient, improves fuel economy, and reduces hydraulic losses. Additionally, the torque converter and torque divider with a lockup clutch of the disclosure has a reduced size and a decreased cost of production. Furthermore, the torque converter and torque divider with a lockup clutch of the disclosure is applicable for use with vehicles.

In accordance with one embodiment, a torque converter and torque divider includes a prime mover input configured to receive a prime mover input torque from a prime mover, a torque converter that includes an impeller, a turbine, and a stator, the torque converter configured to receive an input torque and generate an output torque, a torque divider configured to receive the prime mover input and divide the prime mover input torque into at least a planetary system input torque and a second torque, a planetary gear system configured to receive the planetary system input torque, the planetary gear system includes at least one of a sun gear, a planet gear, a ring gear, and a planet carrier, a lockup clutch configured to lock rotating components of at least one of the torque converter and the torque divider, and a torque output.

In accordance with another embodiment, a process of dividing and converting torque for operation of a vehicle includes receiving a prime mover input torque from a prime mover, receiving an input torque into a torque converter, the torque converter including an impeller, a stator, and a turbine, dividing the prime mover input torque with a torque divider into at least a planetary system input torque and a second torque, receiving the planetary system input torque into a planetary gear system, locking rotating components of at least one of the torque converter and the torque divider, and generating a torque output.

In accordance with a further embodiment, a torque converter and torque divider includes means for receiving a prime mover input torque from a prime mover, means for receiving an input torque into a torque converter means, the torque converter means including impeller means, stator means, and turbine means, means for dividing the prime mover input torque with a torque divider means into at least a planetary means input torque and a second torque, means for receiving the planetary means input torque into a planetary gear system means, means for locking rotating components of at least one of the torque converter means and the torque divider means, and means for generating a torque output.

DETAILED DESCRIPTION

The disclosure will now be described with reference to the drawing figures, in which like reference numerals refer to like parts throughout. Embodiments of the disclosure advantageously provide a torque converter having a torque divider with a lockup clutch that improves efficiency, improves fuel economy, and reduces hydraulic losses. Moreover, a torque converter having a torque divider with a lockup clutch reduces the overall size of the component and furthermore reduces production cost. Finally, the torque converter and torque divider with a lockup clutch of the disclosure is applicable for use with vehicles.

Figure 1:
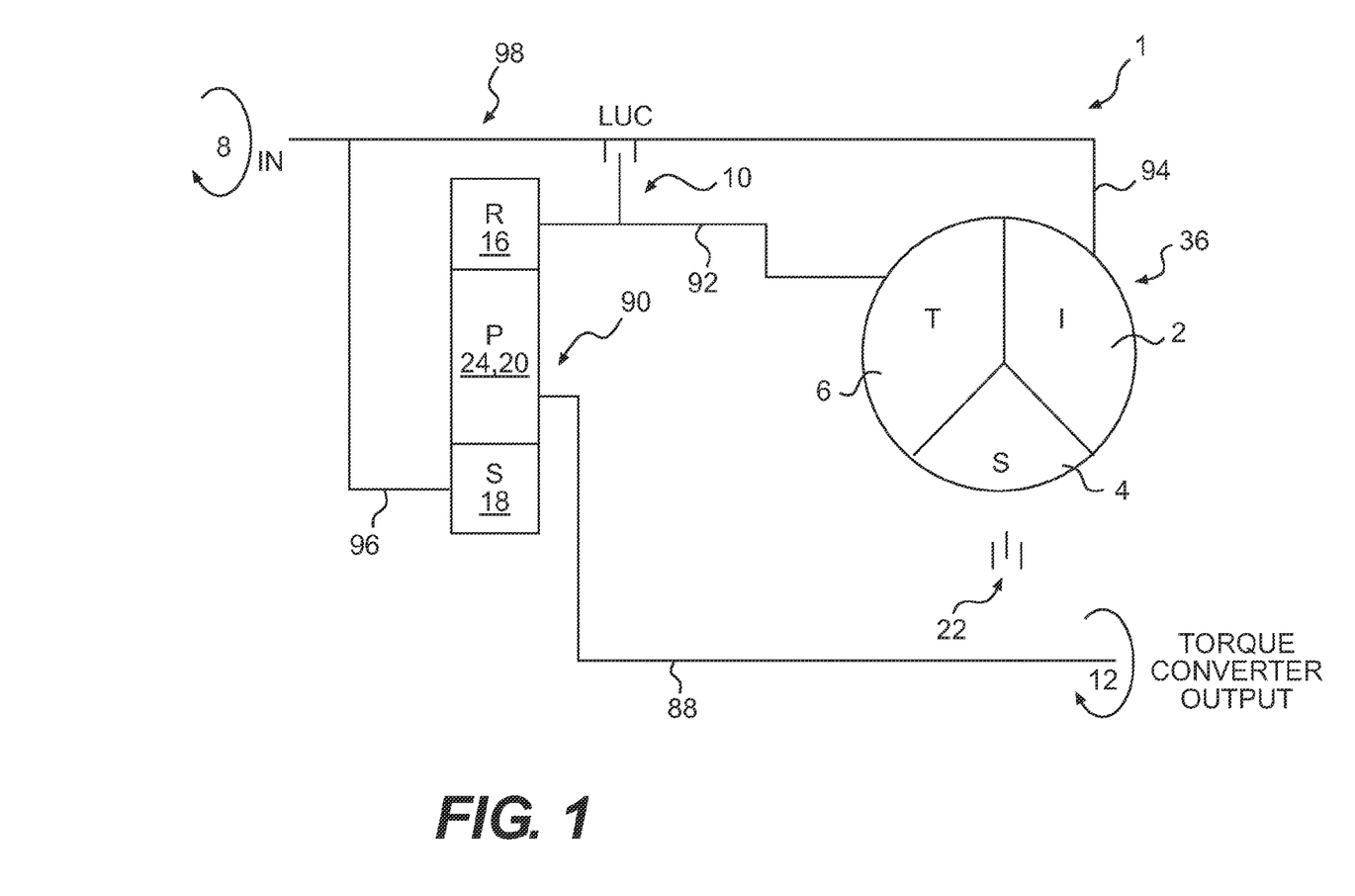
FIG. 1 shows a schematic of a torque converter and torque divider in accordance with an aspect of the disclosure.

FIG. 1 shows a schematic of a torque converter and torque divider in accordance with an aspect of the disclosure. In particular, FIG. 1 shows a torque converter and torque divider 1 that includes a prime mover input 8 and a torque converter output 12. The torque converter and torque divider 1 further includes a torque divider 98 that splits the torque from the prime mover input 8 within the torque converter and torque divider 1. Additionally, FIG. 1 shows a lockup clutch 10 that locks one or more rotationally driven components of the torque converter and torque divider 1. More specifically, the lockup clutch 10 together with the torque divider 98, increases efficiency, improves fuel economy, and reduces hydraulic losses. Moreover, the lockup clutch 10 together with the torque divider 98 results in a reduced component size and cost of production. Furthermore, the torque converter and torque divider 1 with the lockup clutch 10 is applicable for use with vehicles.

In a particular aspect, the lockup clutch 10 may be activated and lock rotation of one or more rotational components of the torque converter and torque divider 1. As shown in FIG. 1, the lockup clutch 10 when activated locks rotation of a turbine 6 to an impeller 2. Accordingly, the losses generated in the torque converter 36 are reduced when the lockup clutch 10 is activated.

The torque converter 36 includes the impeller 2, a stator 4, and the turbine 6. The impeller 2 may rotate as shown in the schematic of FIG. 1 in conjunction with the prime mover input 8. The rotation of the impeller 2 may generate a hydrodynamic fluid coupling within the torque converter 36 and accordingly rotate turbine 6. The stator 4 may be interposed between the impeller 2 and the turbine 6. The stator 4 may positively and efficiently alter the fluid flow between the turbine 6 and the impeller 2. The stator 4 may be rigidly mounted within the torque converter 36. However, in the aspect shown in FIG. 1, the stator 4 is configured to rotate within the torque converter 36. Additionally, the stator 4 may also include a mechanism to limit the rotational movement within the torque converter 36. In one aspect shown in FIG. 1, the stator 4 may include a freewheel clutch 22. The freewheel clutch 22 may allow for rotation of the stator 4 in a desired direction and prevent rotation of the stator 4 in the opposite direction.

The torque divider 98 splits the torque of the prime mover input 8 input by the prime mover. In the aspect shown in FIG. 1, the torque divider 98 splits the torque between the impeller 2 and a planetary system 90. More specifically, prime mover input 8 is split to generate an impeller input torque 94 and a planetary system input torque 96.

The impeller input torque 94 may be transferred to the impeller 2. The impeller 2 rotates within the torque converter 36 in response to the impeller input torque 94 and hydrodynamically couples with the turbine 6 to rotate the turbine 6. Rotation of the turbine 6 generates a turbine output torque 92. The turbine output torque 92 may then be input to the planetary system 90.

The planetary system input torque 96 is input to the planetary system 90. Within the planetary system 90, the turbine output torque 92 and the planetary system input torque 96 are combined and result in a planetary output torque 88. The planetary output torque 88 results in the torque converter output 12. This resulting torque converter output 12 may be generated prior to being input to a transmission. The torque converter output 12 may then be used to drive the load of the vehicle, is input to a vehicle transmission, and/or the like.

In a particular aspect, the planetary system input torque 96 may be used to drive a sun gear 18 of the planetary system 90. The planetary system 90 may have a planet gear 20. The turbine output torque 92 may be used to drive a ring gear 16 of the planetary system 90. Within the planetary system 90, the planetary system input torque 96 and the turbine output torque 92 may be combined and output from a planet carrier 24 as the aforementioned planetary output torque 88.

Although the torque divider 98 is described in conjunction with the planetary system 90, other types of systems are contemplated as well. Moreover, the details of the planetary system 90 can be implemented utilizing other configurations and arrangements of gearing.

Operation of the torque converter and torque divider 1 may include two operational modes: a starting or normal operation wherein the lockup clutch 10 is not activated; and a direct drive mode when the lockup clutch 10 is activated. More specifically, during the starting or normal operation, power or torque from the prime mover input 8 utilizes the torque converter 36 and associated torque multiplication where the impeller 2 rotates and multiplies the torque to rotate the turbine 6. In the direct drive mode, the lockup clutch 10 is actuated to mechanically lock rotation of the impeller 2 and turbine 6 of the torque converter 36. Accordingly, the impeller 2 and turbine 6 rotate at substantially the same speed and there are substantially no hydraulic losses.

Additionally, operation and activation of the lockup clutch 10 may be controlled by dedicated hardware. The dedicated hardware activating and deactivating the lockup clutch 10 may be based on a number of factors. The factors can include one or more of prime mover RPM, power, torque, vehicle speed, vehicle acceleration, transmission operation, vehicle inclination, current power needs, and the like.

The resulting operation of the torque converter and torque divider 1 employing the lockup clutch 10 in conjunction with the torque divider 98 and the torque converter 36 realizes higher efficiency, greater fuel economy, and reduced hydraulic losses. Moreover, a torque converter 36 having a torque divider 98 with a lockup clutch 10 reduces the overall size of the component and furthermore reduces production cost. Finally, the torque converter and torque divider 1 with the lockup clutch 10 of the disclosure is applicable for use with vehicles.

Figure 2:
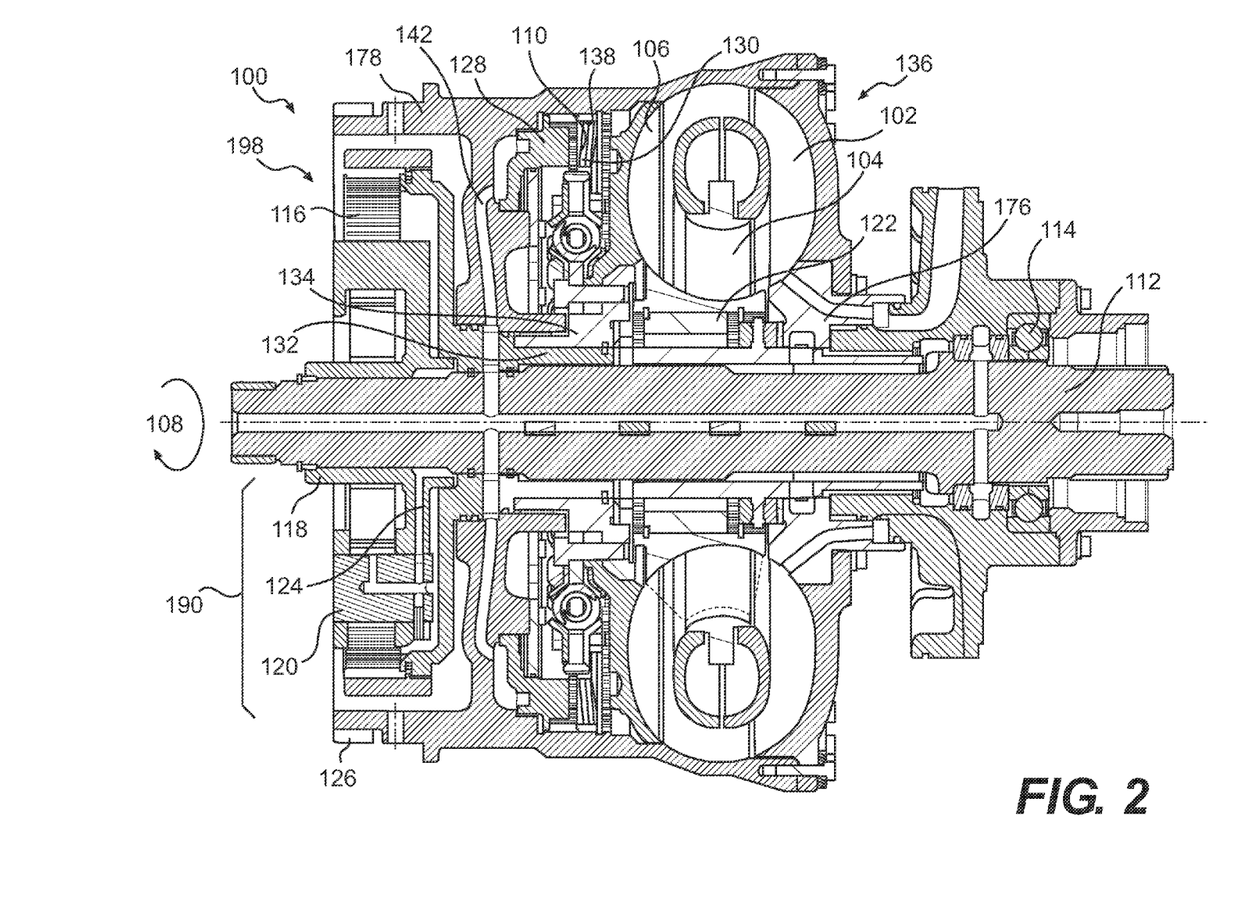
FIG. 2 is a cross-sectional view of an implementation of the torque converter and torque divider of FIG. 1.
Figure 3:
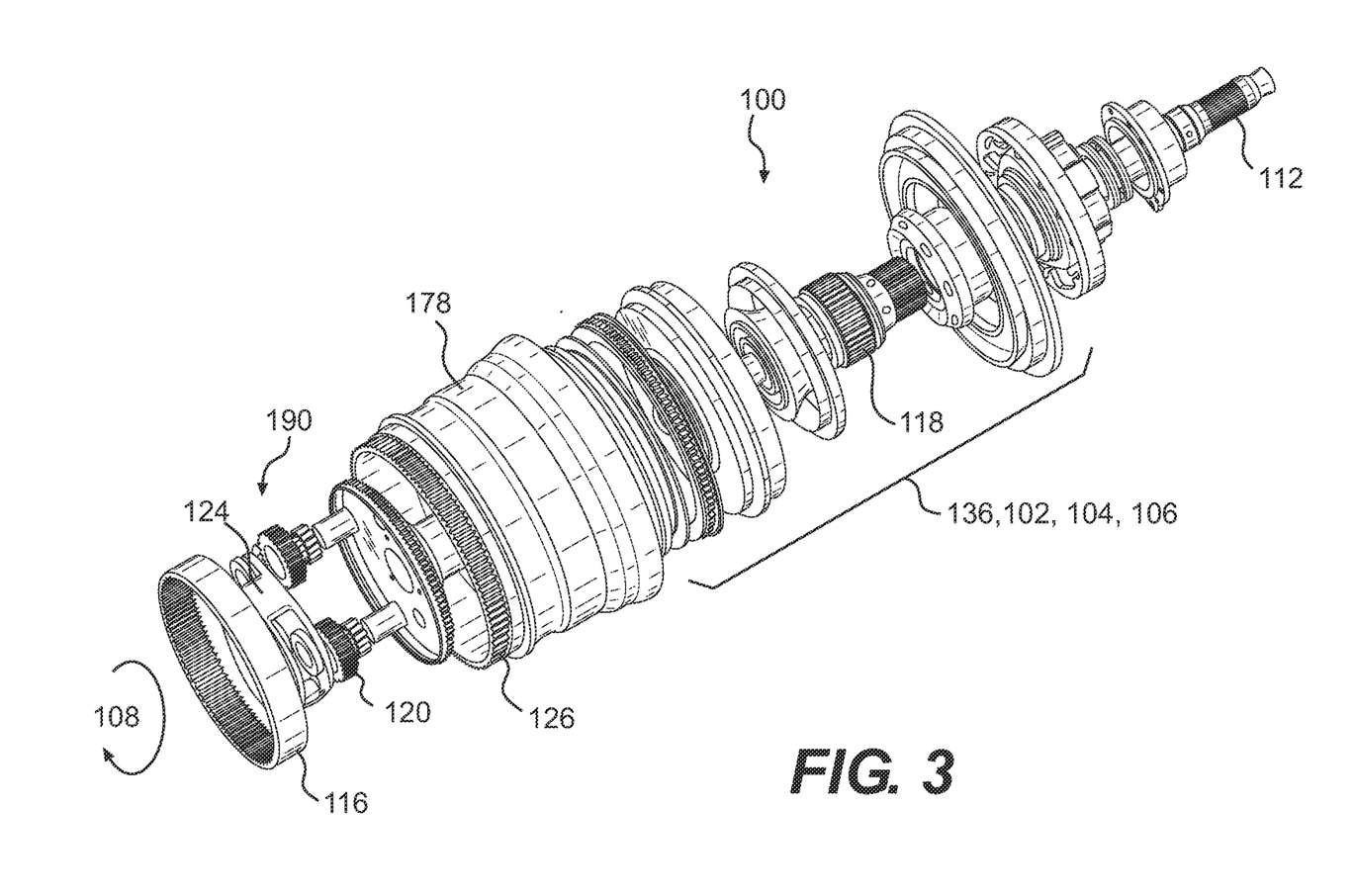
FIG. 3 is an exploded view of the torque converter and torque divider of FIG. 2.
Figure 4:
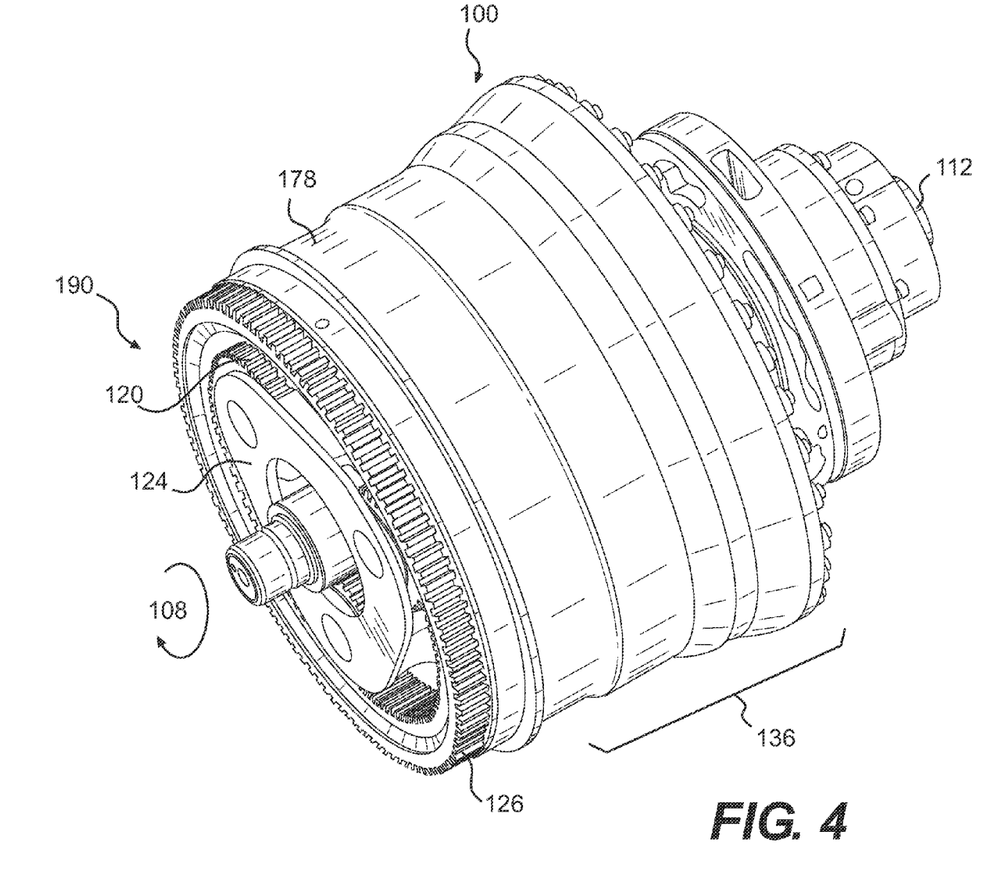
FIG. 4 is a perspective view of the torque converter and torque divider of FIG. 2.

FIG. 2 is a cross-sectional view of an implementation of the torque converter and torque divider of FIG. 1; FIG. 3 is an exploded view of the torque converter and torque divider of FIG. 2; and FIG. 4 is a perspective view of the torque converter and torque divider of FIG. 2. In particular, FIG. 2 is a specific implementation of the torque converter and torque divider 1 of FIG. 1. This particular implementation is exemplary and is one of many implementations that are consistent with the disclosure and the schematic of FIG. 1. As shown in FIG. 2, the prime mover input 108 may be received by a planetary system 190; and the prime mover input 108 may also be received by torque converter 136. In particular, the prime mover input 108 may connect to the torque converter 136 through drive splines 126 that may be arranged on a rotating housing 178.

The rotating housing 178 transfers the rotational torque to the impeller 102. The impeller 102 is located within the torque converter 136. The impeller 102 may be arranged on an impeller hub 176. Also arranged within the torque converter 136 is the turbine 106. Rotational torque may be hydrodynamically transferred from the impeller 102 to the turbine 106 and consequently may be transferred to a turbine hub 134. The rotating housing 178 and/or other components may be supported on bearings throughout the structure such as roller bearings 114 and the like. The turbine hub 134 may include a mechanical connection to an output flange 132. The mechanical connection of the turbine hub 134 to the output flange 132 may be any type of mechanical connection. As shown in FIG. 2, the mechanical connection may be in the form of splines on the output flange 132. Thus, the prime mover input 108 rotates the rotating housing 178, the impeller 102 of the torque converter 136, rotates the turbine 106 and the turbine hub 134, and results in transfer of torque to the output flange 132.

As noted above, the prime mover input 108 is also received by the planetary system 190. In a particular aspect, the prime mover input 108 may be received directly to a sun gear 118. The sun gear 118 may rotate one or more planet gears 120. The one or more planet gears 120 may be held in a planet carrier 124. The one or more planet gears 120 may drive or be driven by a ring gear 116. Accordingly, the sun gear 118 drives the one or more planet gears 120 and one more planet gears 120 may rotate the planet carrier 124. Thus, the torque that is divided between the planetary system 190 and the torque converter 136 is rejoined in planetary system 190, and more specifically may be rejoined in the planet carrier 124, transferred to the ring gear 116, and output by the output shaft 112.

The torque converter 136 may include a stator 104 arranged therein. The stator 104 may include a free-wheel clutch 122 to allow rotation of the stator 104 in one direction and prevent rotation of the stator 104 in the opposite direction. The free-wheel clutch 122 configuration may increase efficiency of the torque converter 136.

Further in FIG. 2, the turbine hub 134 includes a lockup clutch 110. When the lockup clutch 110 is activated, the rotational movement of the rotating housing 178 and the impeller 102 are mechanically locked to the turbine 106 such that the turbine 106 rotates substantially in unison with the impeller 102.

In one particular aspect, the lockup clutch 110 may include one or more friction discs 130 and one or more separation plates 138 arranged therein. The one or more friction discs 130 may rotate with either the turbine 106 or the rotating housing 178. The one or more separation plates 138 may rotate with the other one of the turbine 106 or the rotating housing 178. When the lockup clutch 110 is not activated the one or more friction discs 130 and the one or more separation plates 138 may freely move with respect to one another. When the lockup clutch 110 is activated, the one or more separation plates 138 and the one or more friction discs 130 are pressed against one another such that they no longer freely rotate with respect to one another. The lockup clutch 110 may be activated by operation of a lockup piston 128. The lockup piston 128 may be hydraulically activated or deactivated in response to an application of pressurized hydraulic fluid from a pressurized source of hydraulic fluid applied along hydraulic line 142.

Similar to the operation of the disclosure with respect to FIG. 1, operation of the torque converter and torque divider 100 may include two operational modes: a starting or normal operation wherein the lockup clutch 110 is not activated; and a direct drive mode when the lockup clutch 110 is activated. More specifically, during the starting or normal operation, power or torque from the prime mover utilizes the torque converter 136 and associated torque multiplication where the impeller 102 rotates and multiplies the torque to rotate the turbine 106. In the direct drive mode, the lockup clutch 110 is actuated to mechanically lock rotation of the impeller 102 and turbine 106 of the torque converter 136. Accordingly, the impeller 102 and the turbine 106 rotate at substantially the same speed and there are substantially no hydraulic losses.

Similar to the operation of the disclosure with respect to FIG. 1, operation and activation of the lockup clutch 110 may be controlled by dedicated hardware. The dedicated hardware activating in deactivating the lockup clutch 110 based on a number of factors. The factors can include one or more of prime mover RPM, power, torque, vehicle speed, vehicle acceleration, transmission operation, vehicle inclination, current power needs, and the like.

The resulting operation of the torque converter and torque divider 100 employing the lockup clutch 110 in conjunction with the torque divider 198 and the torque converter 136 realizes higher efficiency, greater fuel economy, and reduced hydraulic losses. Moreover, the lockup clutch 110 together with the torque divider 198 results in a reduced component size and cost of production. Furthermore, the torque converter and torque divider 100 with the lockup clutch 110 is applicable for use with vehicles.

Figure 5:
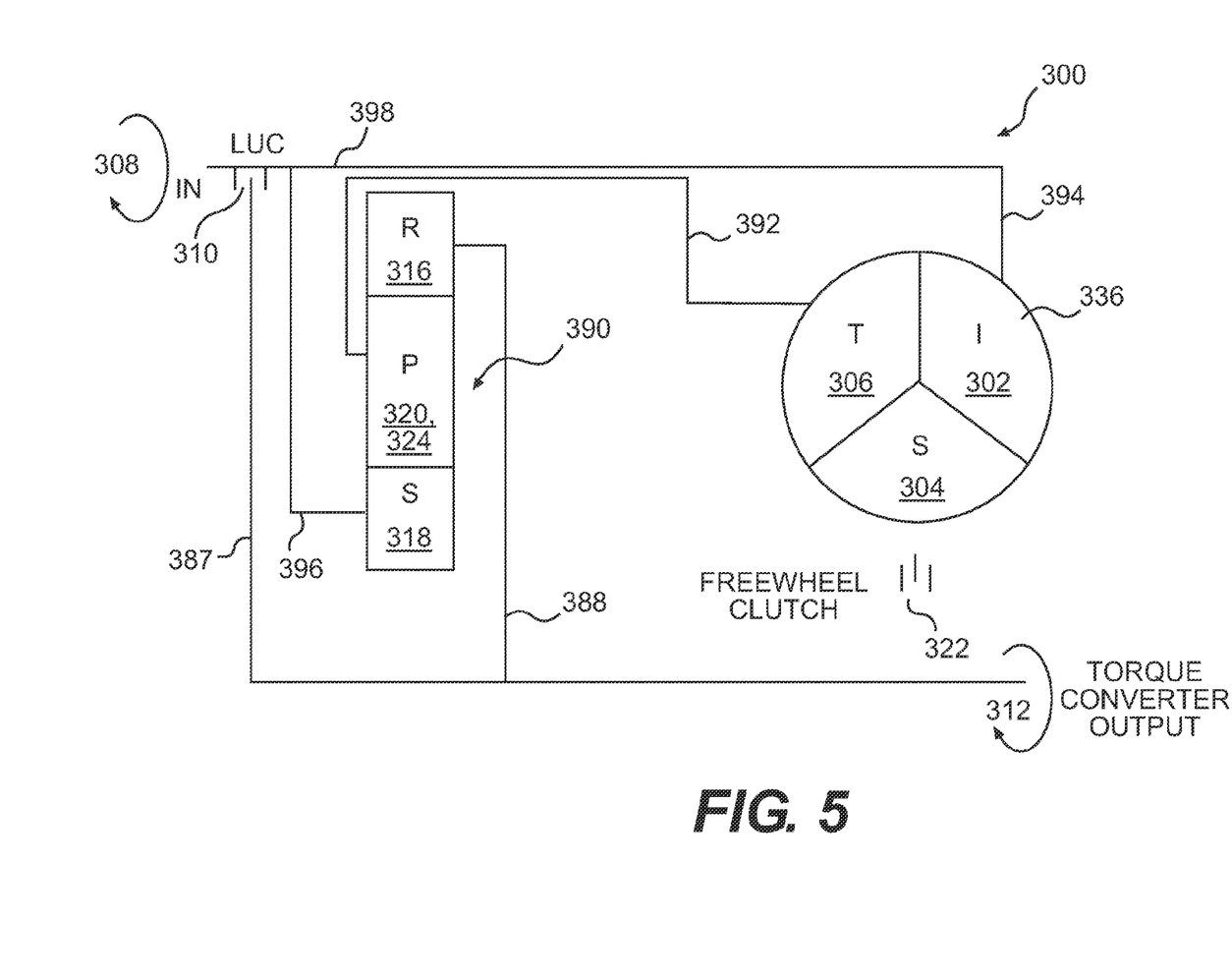
FIG. 5 is another schematic of a torque converter and torque divider in accordance with the disclosure.

FIG. 5 is another schematic of a torque converter and torque divider in accordance with the disclosure. In particular, FIG. 5 shows a torque converter and torque divider 300 that includes a prime mover input 308 and a torque converter output 312. The torque converter and torque divider 300 further includes a torque divider 398 that splits the torque from the prime mover input 308 within the torque converter and torque divider 300. Additionally, FIG. 5 shows a lockup clutch 310 that locks one or more rotationally driven components of the torque converter and torque divider 300. More specifically, the lockup clutch 310 together with the torque divider 398, increases efficiency, improves fuel economy, and reduces hydraulic losses. Moreover, the lockup clutch 310 together with the torque divider 398 results in a reduced component size and cost of production. Furthermore, the torque converter and torque divider 300 with the lockup clutch 310 is applicable for use with vehicles.

In a particular aspect, the lockup clutch 310 may be activated and lock rotation of one or more rotational components of the torque converter and torque divider 300. As shown in FIG. 5, the lockup clutch 310 when activated locks rotation of the prime mover input 308 to the torque converter output 312. Accordingly, the losses generated in the torque converter 336 are substantially reduced when the lockup clutch 310 is activated.

The torque converter 336 includes an impeller 302, a stator 304, and a turbine 306. The impeller 302 may rotate as shown in the schematic of FIG. 5 in conjunction with the prime mover input 308. The rotation of the impeller 302 may generate a hydrodynamic fluid coupling within the torque converter 336 and accordingly rotate turbine 306. The stator 304 may be interposed between the impeller 302 and the turbine 306. The stator 304 may positively and efficiently alter the fluid flow between the turbine 306 and the impeller 302. The stator 304 may be rigidly mounted within the torque converter 336. However, in the aspect shown in FIG. 5, the stator 304 is configured to rotate within the torque converter 336. Additionally, the stator 304 may also include a mechanism to limit the rotational movement within the torque converter 336. In one aspect shown in FIG. 5, the stator 304 may include a freewheel clutch 322. The freewheel clutch 322 may allow for rotation of the stator 304 in a desired direction and prevent rotation of the stator 304 in the opposite direction.

The torque divider 398 splits the torque that is input by the prime mover input 308. In the aspect shown in FIG. 5, the torque divider 398 splits the torque between the impeller 302 and a planetary system 390. More specifically, the torque from the prime mover input 308 is split to generate an impeller input torque 394 and a planetary system input torque 396.

The impeller input torque 394 may be transferred to the impeller 302. The impeller 302 rotates within the torque converter 336 in response to the impeller input torque 394 and hydrodynamically couples with the turbine 306 to rotate the turbine 306. Rotation of the turbine 306 generates a turbine output torque 392. The turbine output torque 392 may then be input to the planetary system 390.

When the lockup clutch 310 is activated, rotation of the prime mover input 308 produces a lockup clutch torque 387. The lockup clutch torque 387 may be input and accordingly tied to the torque converter output 312.

The planetary system input torque 396 is input to the planetary system 390. Within the planetary system 390, the turbine output torque 392 and the planetary system input torque 396 are combined and result in a planetary output torque 388. The planetary output torque 388, together with the lockup clutch torque 387, when the lockup clutch 310 is activated, may result in the torque converter output 312. On the other hand, the planetary output torque 388, when the lockup clutch 310 is deactivated, may result in the torque converter output 312. This resulting torque converter output 312 may be generated prior to being input to a transmission. The torque converter output 312 may then be used to drive the load of the vehicle, is input to a vehicle transmission, and/or the like.

In a particular aspect, the planetary system input torque 396 may be used to drive a sun gear 318 of the planetary system 390. The planetary system 390 may have a planet gear 320. The turbine output torque 392 may be used to drive a planet carrier 324 of the planetary system 390. Within the planetary system 390, the planetary system input torque 396 and the turbine output torque 392 may be combined and output from a ring gear 316 as the aforementioned planetary output torque 388.

Although the torque divider 398 is described in conjunction with the planetary system 390, other types of torque dividing systems are contemplated as well. Moreover, the details of the planetary system 390 can be implemented utilizing other configurations and arrangements of gearing.

Similar to other aspects described herein, operation of the torque converter and torque divider 300 may include two operational modes: a starting or normal operation wherein the lockup clutch 310 is not activated; and a direct drive mode when the lockup clutch 310 is activated. More specifically, during the starting or normal operation, power or torque from the prime mover input 308 utilizes the torque converter 336 and associated torque multiplication where the impeller 302 rotates and multiplies the torque to rotate the turbine 306. In the direct drive mode, the lockup clutch 310 is actuated to mechanically lock the prime mover input 308 to the torque converter output 312. Accordingly, the impeller 302 and turbine 306 rotation transfers limited torque and there are substantially no hydraulic losses.

Similar to that as described above, operation and activation of the lockup clutch 310 may be controlled by dedicated hardware. The dedicated hardware activating in deactivating the lockup clutch 310 based on a number of factors. The factors can include one or more of prime mover RPM, power, torque, vehicle speed, vehicle acceleration, transmission operation, vehicle inclination, current power needs, and the like.

The resulting operation of the torque converter and torque divider 300 employing the lockup clutch 310 in conjunction with the torque divider 398 and the torque converter 336 realizes higher efficiency, greater fuel economy, and reduced hydraulic losses. Moreover, a torque converter 336 having a torque divider 398 with a lockup clutch 310 reduces the overall size of the component and furthermore reduces production cost. Finally, the torque converter and torque divider 300 with the lockup clutch 310 of the disclosure is applicable for use with earthmoving and mining machines.

Figure 6:
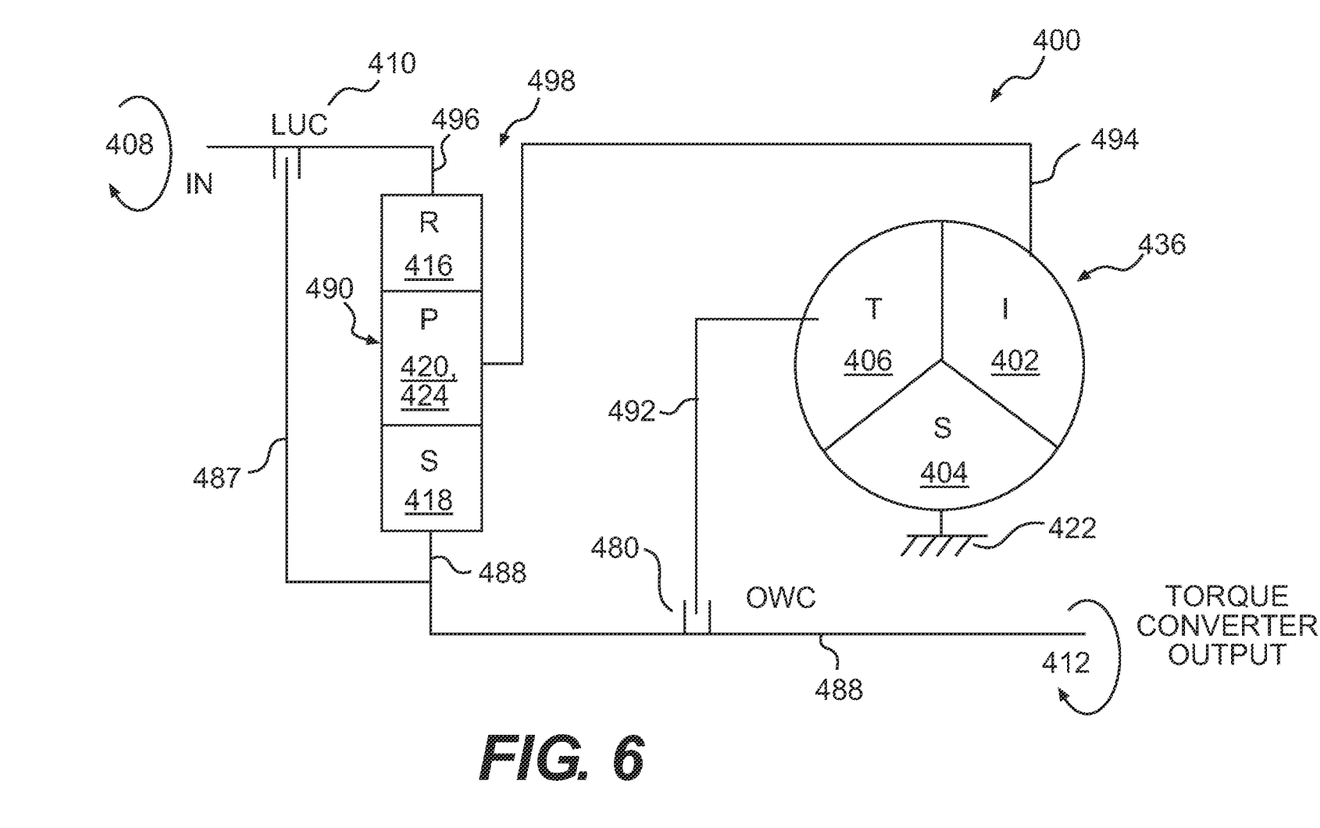
FIG. 6 is another aspect of a torque converter and torque divider in accordance with aspects of the disclosure.

FIG. 6 is another aspect of a torque converter and torque divider in accordance with aspects of the disclosure. In particular, FIG. 6 shows a torque converter and torque divider 400 that includes a prime mover input 408 and a torque converter output 412. The torque converter and torque divider 400 further includes a torque divider 498 that splits the torque from the prime mover input 408 within the torque converter and torque divider 400. Additionally, FIG. 6 shows a lockup clutch 410 that locks one or more rotationally driven components of the torque converter and torque divider 400. More specifically, the lockup clutch 410 together with the torque divider 498, increases efficiency, improves fuel economy, and reduces hydraulic losses. Moreover, the lockup clutch 410 together with the torque divider 498 results in a reduced component size and cost of production. Furthermore, the torque converter and torque divider 400 with the lockup clutch 410 is applicable for use with vehicles.

In a particular aspect, the lockup clutch 410 may be activated and lock rotation of one or more rotational components of the torque converter and torque divider 400. As shown in FIG. 6, the lockup clutch 410 when activated locks rotation of the prime mover input 408 to the torque converter output 412. Accordingly, the losses generated in the torque converter 436 are substantially reduced when the lockup clutch 410 is activated.

The torque converter 436 includes an impeller 402, a stator 404, and a turbine 406. The impeller 402 may rotate as shown in the schematic of FIG. 6 in conjunction with the prime mover input 408. The rotation of the impeller 402 may generate a hydrodynamic fluid coupling within the torque converter 436 and accordingly rotate turbine 406. The stator 404 may be interposed between the impeller 402 and the turbine 406. The stator 404 may positively and efficiently alter the fluid flow between the turbine 406 and the impeller 402. The stator 404 may be rigidly mounted with stator structure 422 within the torque converter 436. However, the stator 404 may alternatively be configured to rotate within the torque converter 436 and/or may also alternatively include a mechanism to limit the rotational movement within the torque converter 436.

The torque divider 498 splits the torque that is input by the prime mover input 408. In the aspect shown in FIG. 6, the torque divider 498 splits the torque in a planetary system 490. More specifically, the torque from the prime mover input 408 is split to generate an impeller input torque 494 and a planetary system output torque 488.

The impeller input torque 494 may be transferred to the impeller 402. The impeller 402 rotates within the torque converter 436 in response to the impeller input torque 494 and hydrodynamically couples with the turbine 406 to rotate the turbine 406. Rotation of the turbine 406 generates a turbine output torque 492. In particular the turbine output torque 492 may connect through a one-way clutch 480 to provide torque to the torque converter output 412.

The planetary system input torque 496 is input to the planetary system 490. The planetary system 490 outputs the impeller input torque 494 and also outputs the planetary system output torque 488. The prime mover input 408 may also provide torque through the lockup clutch 410. When the lockup clutch 410 is activated, the torque converter and torque divider 400 generates the lockup clutch torque 487.

The combination of the lockup clutch torque 487, the planetary system output torque 488 and the turbine output torque 492 may be combined to result in torque converter output 412. This resulting torque converter output 412 may be generated prior to being input to a transmission. The torque converter output 412 may then be used to drive the load of the vehicle, is input to a vehicle transmission, and/or the like.

In a particular aspect, the planetary system input torque 496 may be used to drive a ring gear 416 of the planetary system 490. The planetary system 490 may include a planet gear 420. A planet carrier 424 of the planetary system 490 may output the impeller input torque 494. Within the planetary system 490, the sun gear 418 may output the aforementioned planetary system output torque 488.

Although the torque divider 498 is described in conjunction with the planetary system 490, other types of torque dividing systems are contemplated as well. Moreover, the details of the planetary system 490 can be implemented utilizing other configurations and arrangements of gearing.

In a similar manner as described above, the torque converter and torque divider 400 may include two operational modes: a starting or normal operation wherein the lockup clutch 410 is not activated; and a direct drive mode when the lockup clutch 410 is activated. More specifically, during the starting or normal operation, power or torque from the prime mover input 408 utilizes the torque converter 436 and associated torque multiplication where the impeller 402 rotates and multiplies the torque to rotate the turbine 406. In the direct drive mode, the lockup clutch 410 is actuated to mechanically lock the prime mover input 408 to the torque converter output 412. Accordingly, there are substantially no hydraulic losses.

Additionally, operation and activation of the lockup clutch 410 may be controlled by dedicated hardware. The dedicated hardware activating in deactivating the lockup clutch 410 based on a number of factors. The factors can include one or more of prime mover RPM, power, torque, vehicle speed, vehicle acceleration, transmission operation, vehicle inclination, current power needs, and the like.

The resulting operation of the torque converter and torque divider 400 employing the lockup clutch 410 in conjunction with the torque divider 498 and the torque converter 436 realizes higher efficiency, greater fuel economy, and reduced hydraulic losses. Moreover, the torque converter 436 having the torque divider 498 with a lockup clutch 410 reduces the overall size of the component and furthermore reduces production cost. Finally, the torque converter and torque divider 400 with the lockup clutch 410 of the disclosure is applicable for use with earthmoving and mining machines.

INDUSTRIAL APPLICABILITY

The disclosure is universally applicable as a torque converter having a torque divider for many types of off highway vehicles, such as, for example, machines associated with industries such as mining, construction, farming, transportation, etc. For example, the vehicle may be an earth-moving machine, such as a track type tractor, track loader, wheel loader, excavator, dump truck, backhoe, motor grader, material handler, etc. Additionally, one or more implements may be connected to the vehicle, which may be used for a variety of tasks, including, for example, brushing, compacting, grading, lifting, loading, plowing, ripping, and include, for example, augers, blades, breakers/hammers, brushes, buckets, compactors, cutters, forked lifting devices, grader bits and end bits, grapples, moldboards, rippers, scarifiers, shears, snow plows, snow wings, etc.

Further in accordance with various embodiments of the disclosure, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the hardware implementations may include software implementations that are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

The many features and advantages of the disclosure are apparent from the detailed specification, and, thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A torque converter and torque divider, comprising:
a prime mover input configured to receive a prime mover input torque from a prime mover;
a torque converter that includes an impeller, a turbine, and a stator, the torque converter configured to receive an input torque and generate an output torque;
a torque divider configured to receive the prime mover input and divide the prime mover input torque into at least a planetary system input torque and a second torque;
a planetary gear system configured to receive the planetary system input torque, the planetary gear system includes at least one of a sun gear, a planet gear, a ring gear, and a planet carrier;
a lockup clutch configured to lock rotating components of at least one of the torque converter and the torque divider; and
a torque output.

2. The torque converter and torque divider of claim 1, wherein the lockup clutch locks rotation of the impeller to rotation of the turbine.

3. The torque converter and torque divider of claim 1, wherein the planetary gear system includes the sun gear, the planet gear, the ring gear, and the planet carrier; and wherein an output of the turbine is input into the ring gear, the planetary system input torque is input to the sun gear, and the planet carrier connects to the torque output.

4. The torque converter and torque divider of claim 1, wherein the lockup clutch locks rotation of the prime mover input to rotation of the torque output.

5. The torque converter and torque divider of claim 4, wherein the planetary gear system includes the sun gear, the planet gear, the ring gear, and the planet carrier; and wherein an output of the turbine is input into the planet carrier, the planetary system input torque is input to the sun gear, and the ring gear connects to the torque output.

6. The torque converter and torque divider of claim 4, wherein the planetary gear system includes the sun gear, the planet gear, the ring gear, and the planet carrier; and wherein the planetary system input torque connects to the ring gear, the planet carrier connects to the impeller, and the sun gear and the turbine connects to the torque output.

7. The torque converter and torque divider of claim 6, further comprising a one-way clutch to connect the turbine to the torque output.

8. The torque converter and torque divider of claim 1, wherein the lockup clutch includes at least one friction disk and at least one separation disk.

9. A vehicle comprising a prime mover, a transmission, and the torque converter and torque divider of claim 1.

10. A process of dividing and converting torque for operation of a vehicle, comprising:
   receiving a prime mover input torque from a prime mover;
   receiving an input torque into a torque converter, the torque converter including an impeller, a stator, and a turbine;
   dividing the prime mover input torque with a torque divider into at least a planetary system input torque and a second torque;
   receiving the planetary system input torque into a planetary gear system;
   locking rotating components of at least one of the torque converter and the torque divider; and
   generating a torque output.

11. The process of claim 10, wherein the locking rotating components includes locking rotation of the impeller to rotation of the turbine.

12. The process of claim 10, further comprising inputting into a ring gear of the planetary gear system an output of the torque converter, and inputting the planetary system input torque to a sun gear of the planetary gear system, and wherein the generating a torque output includes connecting to a planet carrier of the planetary gear system.

13. The process of claim 10, wherein the locking rotating components comprises locking rotation of the prime mover input to rotation of the torque output.

14. The process of claim 13, further comprising inputting an output of the turbine into a planet carrier of the planetary gear system, inputting the planetary system input torque to a sun gear of the planetary gear system, and wherein the generating a torque output includes connecting to a ring gear of the planetary gear system.

15. The process of claim 13, further comprising inputting the prime mover input to a ring gear of the planetary gear system, connecting the impeller to a planet carrier of the planetary gear system, and combining torque from a sun gear of the planetary system and the second torque to generate the torque output.

16. A torque converter and torque divider, comprising:
   means for receiving a prime mover input torque from a prime mover;
   means for receiving an input torque into a torque converter means, the torque converter means including impeller means, stator means, and turbine means;
   means for dividing the prime mover input torque with a torque divider means into at least a planetary means input torque and a second torque;
   means for receiving the planetary means input torque into a planetary gear system means;
   means for locking rotating components of at least one of the torque converter means and the torque divider means; and
   means for generating a torque output.

17. The torque converter and torque divider of claim 16, wherein the means for locking rotating components includes locking rotation of the impeller means to rotation of the turbine means.

18. The torque converter and torque divider of claim 16, further comprising means for inputting into a ring gear of the planetary gear system means an output of the torque converter means, and means for inputting the planetary means input torque to a sun gear of the planetary gear system means, and wherein the means for generating a torque output includes means for connecting to a planet carrier of the planetary gear system means.

19. The torque converter and torque divider of claim 16, wherein the means for locking rotating components comprises locking rotation of the means for receiving a prime mover input torque to rotation of the means for generating a torque output.

20. The torque converter and torque divider of claim 19, further comprising means for inputting the planetary system input torque to the planetary gear system, and wherein the means for generating a torque output includes combining an output of the planetary gear system means and the second torque.

* * * * *